Feb. 23, 1971   E. SMITH ET AL   3,565,717
RESIN COATED SHEET MATERIAL
Filed June 12, 1967   3 Sheets-Sheet 3
- FIG. 4. -
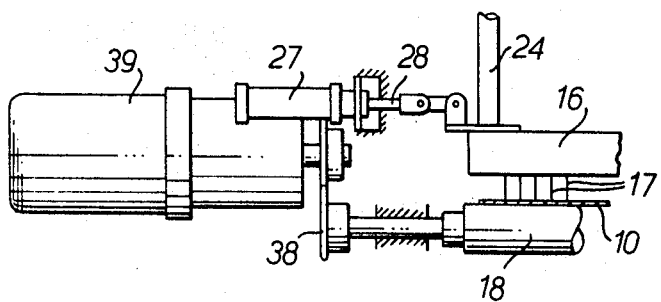
- FIG. 5. -
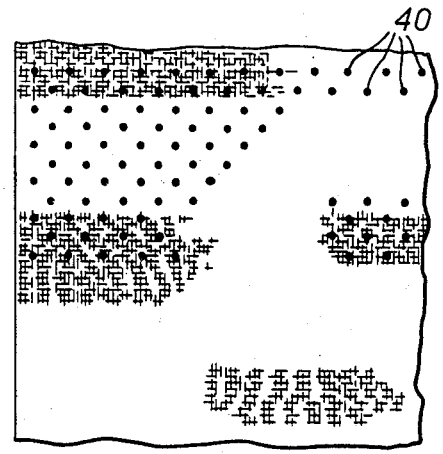
INVENTORS
ERIC SMITH
DAVID E. MORRIS
BY
Attys.

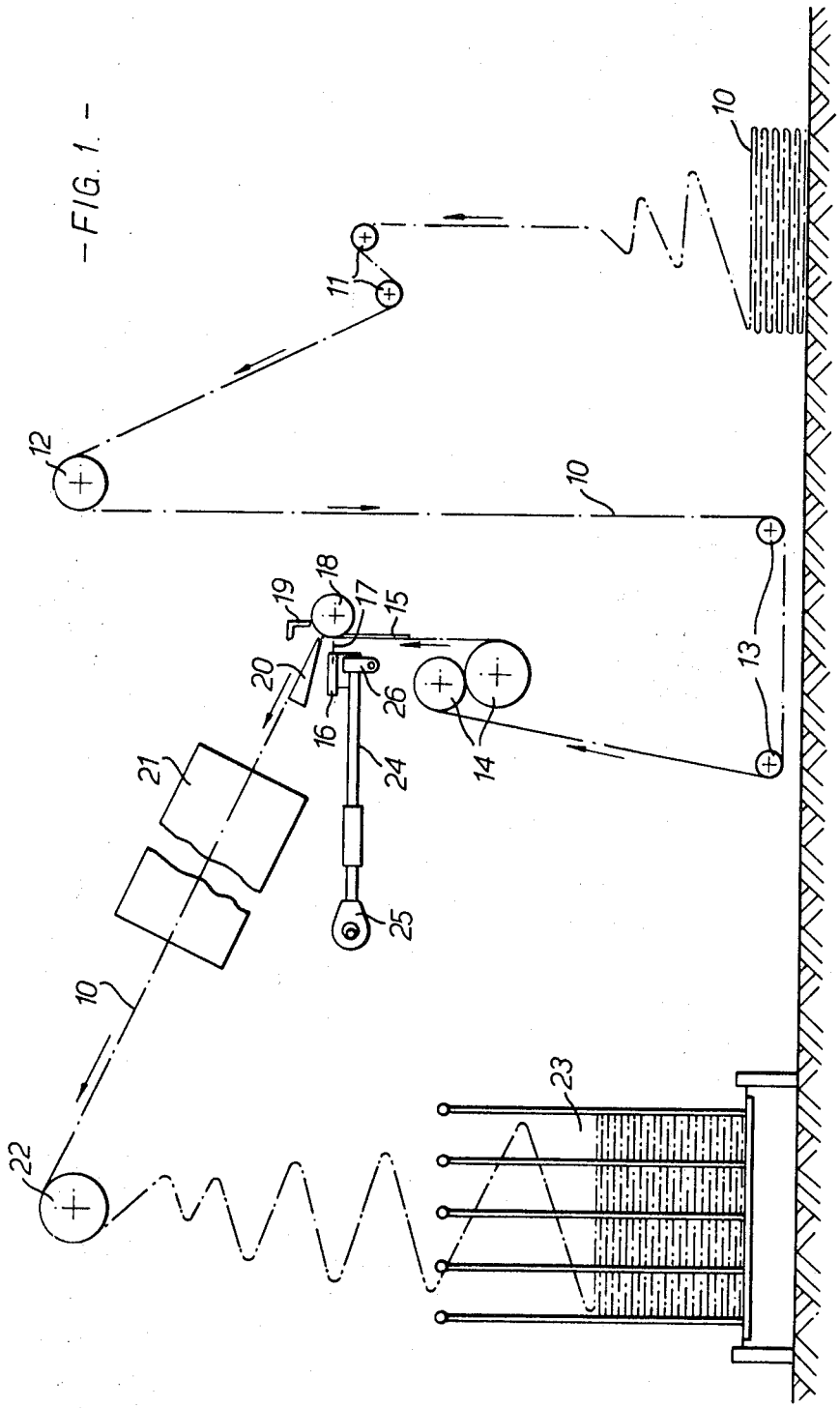

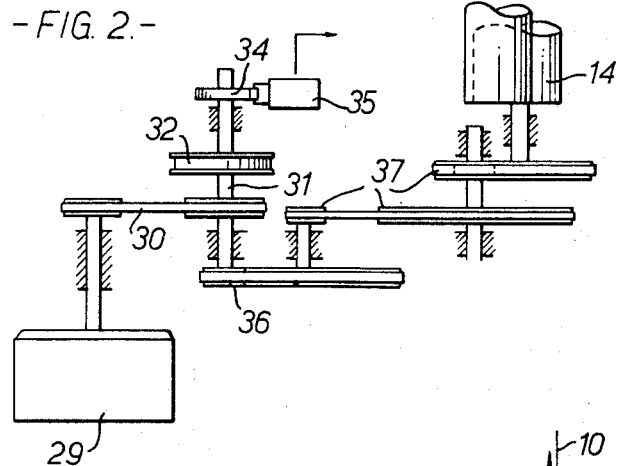
-FIG. 2.-
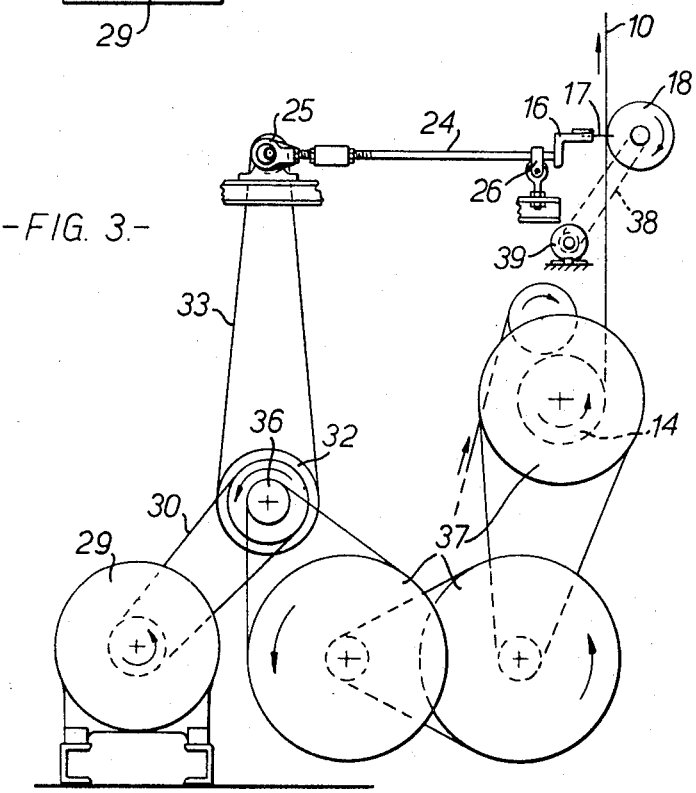
-FIG. 3.-

United States Patent Office 3,565,717
Patented Feb. 23, 1971

3,565,717
RESIN COATED SHEET MATERIAL
Eric Smith, Bury, and David Eric Morris, Leeds, England, assignors, by mesne assignments, to English Calico Limited, Lancashire, England
Filed June 12, 1967, Ser. No. 645,209
Claims priority, application Great Britain, June 21, 1966, 27,654/66
Int. Cl. B32b 7/14
U.S. Cl. 156—148                             4 Claims

ABSTRACT OF THE DISCLOSURE

This invention is concerned with a process for the production of sheet material having adhered to at least one surface thereof a discontinuous layer of discrete beads or globules of thermoplastic resin, for example the type of material known as a fusible interlining. In this process the sheet material is caused to travel between a reciprocable bar carrying a row of spaced apart needles and a roller carrying a coating of a thermoplastic resin paste, the needles being caused to penetrate the sheet material and pick up resin paste on their points in one movement of the bar, the reverse movement causing withdrawal of the needles from the sheet material leaving a row of spaced apart beads of resin on the material. The reciprocal movement of the bar is such that there is no relative movement between the needles and the sheet material in the direction of travel of the latter so that any tearing or weakening of the sheet material is avoided. Sheet material having the patterned rows of spaced apart beads or globules of resin adhering thereto may then be laminated with other sheet material under the action of heat and pressure.

---

According to the present invention there is provided a method of forming sheet material having beads or bead-like globules of thermoplastic resin adhering to one surface thereof in spaced apart relationship in a controlled pattern which comprises feeding a base or support sheet between a roller and a straight bar carrying a row of spaced apart needles, which needles project from the bar towards the roller, supplying the surface of the roller with a coating of a thermoplastic resin composition, reciprocating the bar so that the needles repeatedly penetrate the base sheet without any substantial relative movement between the needles and the sheet in the direction of travel of the latter, whereby the needle points after each penetration of the sheet pick up resin composition from the roller and on withdrawal through the base or support sheet leave a row of spaced apart beads or bead-like globules of resin composition adhering to a surface of the support sheet and then passing the treated sheet through a drying chamber to gel or cure the resin.

Where the bar carries a single row of needles it is preferred in addition to oscillate the needle carrying bar in a direction transverse to the path of travel of the sheet material whereby the beads or bead-like globules of resin composition left adhering in one row on the base or support sheet are staggered in relation to the beads or bead-like globules adhering to the sheet in the next adjacent row.

The base or support sheet may for example be woven material ranging from a slack open weave to a dense close weave, knitted material, a non-woven tissue or foamed plastic material. The thermoplastic resin composition used for forming the beads may be based on any suitable synthetic resin but particular suitable compositions are those based on polyvinyl chloride or co-polymers of polyvinyl chloride with vinyl acetate and incorporating a plasticiser.

Apparatus for forming the resin-coated sheet material described in the preceding paragraphs in accordance with the invention comprises a straight bar or beam carrying a row of needles projecting therefrom, a paste applying roller facing said bar, means for supplying resin composition to said roller to provide a coating thereon, means for feeding sheet material between said bar and said roller, means for reciprocating the needle-carrying bar to cause the needles to penetrate the sheet passing between the bar and the resin applicator roll, and means for drying the sheet after application of the resin.

The invention will now be illustrated with reference to the accompanying drawings wherein:

FIG. 1 is a diagrammatic side view of an arrangement of apparatus for producing the resin coated material in accordance with the invention, FIG. 2 is a diagrammatic plan view of driving means of the apparatus, FIG. 3 is a diagrammatic elevational view of driving means for the apparatus, FIG. 4 is a fragmentary plan view in greater detail of part of the mechanism shown in FIGS. 1 and 3 and FIG. 5 is a plan view of a typical piece of sheet material coated in accordance with the invention.

Referring now to FIG. 1, sheet material 10 in lapped form is drawn over tension rollers 11, draw roll 12, carrier rolls 13, feed nip rolls 14, guide plate 15, and then passes between a straight bar 16 carrying a row of needles 17 and a resin paste applying roll 18 provided with doctor 19. After passing between bar 16 and roll 18, the material 10 then passes over deflector plate 20, through a drying chamber 21, over a further roll 22 and is collected in a receiving truck 23.

The needle carrying bar 16 is connected to rods 24 of a self-aligning eccentric 25, the rods sliding in a fulcrum bracket 26, and as the eccentric shaft revolves the needle points move in an elliptical path the needles entering the material 10 at the base of the ellipse and withdrawing from the material at the apex, the needle points travelling at the same speed in a vertical plane as the surface speed of the cloth.

Resin paste is fed to roll 18 by means not illustrated and a coating of the desired thickness is formed on the roll by means of the doctor 19. The weight of the resin deposit on the cloth can be varied by adjusting through the doctor 19 the thickness of the coating on the applicator roll 18. As each forward movement of the needle bar 16 causes the needles 17 to penetrate the cloth 10 the needle points extend into the resin paste coating on the roll 18 and with the withdrawal of the needles through the material a bead of resin is left on the material.

In addition to the reciprocal motion imparted to the needle carrying bar 16 this is also oscillated in a direction transverse to the path of travel of material 10 by means of a pressure-operated piston and cylinder device 27, 28 (FIG. 4) the piston 28 being connected to the end of the bar 16. The oscillating movement is such that at each successive penetration and withdrawal of the cloth by the needles the bead or bead-like globules of resin composition left adhering on the material 10 in one row are staggered in relation to the beads adhering to the material in the next adjacent row.

Driving means for the rolls and parts of mechanism of the apparatus are illustrated in FIGS. 2, 3 and 4. Motor 29 drives through the belt drive 30 a shaft 31 which has fixed on it a pulley 32 which through belt 33 drives the eccentric 25. A cam 34 on an extension of shaft 31 operates the four-way valve 35 which controls the cylinder and piston device 27, 28 (FIG. 4). The cam 35 is driven at half the speed of the eccentric enabling the needle frame to be moved transversly one stroke per revolution of the eccentric shaft.

Also fitted on shaft 31 is a pulley 36 which through pulley and belt reduction drive 37 drives the lower roll of the nip rolls 14. This roll is driven at a constant speed and variation of the speed will vary the horizontal pitching of the beads of resin applied.

The resin paste applying roll 18 is driven independently through chain and sprocket mechanism 38 from a second motor 39 (FIG. 4).

It is possible by the process in accordance with the invention to produce on the sheet material 10 a spot or bead 40 of spherical or near spherical shape (FIG. 5) which has the advantage of having a much stronger keying effect or bond when the resin treated material is fused to a second sheet material. The size of the beads or globules of resin will depend on the depth to which the needles, the pitch of which may be for example from 1/16 to 1/8 of an inch penetrate into the layer of resin composition on the paste applying roll 18.

This sheet material having the applied beads or bead-like globules of thermoplastic resin adhering to one surface thereof can be securely bonded to any other sheet material by the application of heat and pressure for example by engagement between rollers or platens, one or each of which is heated by steam or electrical means. Accordingly the invention provides a method for forming a laminated fabric which comprises uniting a resin treated sheet material, produced as described above under the action of heat and pressure with a second sheet material.

It wil be appreciated that where the beads or bead-like globules of resin composition adhering to the treated material are staggered in adjacent rows the tendency in a laminated or combined fabric to show ribs or stripes because of uniformly aligned rows of dots is substantially eliminated.

Whilst the invention is of particular importance in relation to the production of a fusible interlining it is also possible to produce material having decorative effects, for example with a sequinned appearance by the use of brightly coloured resin paste.

Resin pastes particularly suitable for use in the production of fusible interlining material are plastisols from polyvinyl chloride and a plasticiser therefor and which are non-aqueous. They may include other polymers for example a vinyl acetate/chloride copolymer and may also include, stabilisers, thickeners or an emulsifying agent. A commercially available polyvinyl chloride plastisol sold under the trade name Deckor has been found very satisfactory.

We claim:

1. A method of forming sheet material having bead-like globules of cured synthetic resin adhering to and outstanding from one surface thereof, which comprises the steps of:
   (a) supporting said sheet on longitudinally spaced portions thereof to leave said one surface exposed therebetween and longitudinally feeding said sheet along a path extending in one region between the supported portions;
   (b) repeatedly puncturing said sheet in said one region of the path with a plurality of needles passed through said sheet from its second surface opposite said one surface thereof;
   (c) applying uncured synthetic resin to the tips of said needles;
   (d) withdrawing said needles to leave bead-like globules of uncured resin on said one surface;
   (e) controlling the movements of said needles and said sheet during steps (b), (c) and (d) to avoid any substantial relative movement therebetween during such steps (b), (c) and (d);
   (f) maintaining said one surface with the globules thereon exposed as said sheet moves beyond said one region;
   (g) curing the globules while exposed as recited in step (f), feeding the sheet continuously along said path and moving said needles in a compound path of movement passing through said sheet and both penetrating said sheet and moving longitudinally at substantially the same speed of travel as the sheet during steps (b), (c) and (d) for applying said globules only at an area substantially equal to said needle tips.

2. A method of forming sheet material having bead-like globules of cured synthetic resin adhering to and outstanding from one surface thereof, which comprises the steps of:
   (a) supporting said sheet on longitudinally spaced portions thereof to leave said one surface exposed therebetween and longitudinally feeding said sheet along a path extending in one region between the supported portions;
   (b) repeatedly puncturing said sheet in said one region of the path with a plurality of needles passed through said sheet from its second surface opposite said one surface thereof;
   (c) applying uncured synthetic resin to the tips of said needles;
   (d) withdrawing said needles to leave bead-like globules of uncured resin on said one surface;
   (e) controlling the movements of said needles and said sheet during steps (b), (c) and (d) to avoid any substantial relative movement therebetween during such steps (b), (c) and (d);
   (f) maintaining said one surface with the globules thereon exposed as said sheet moves beyond said one region; and,
   (g) curing the globules while exposed as recited in step (f), said needles being shifted in a direction transverse to the path of travel of the support sheet prior to successive steps (b) so that the bead-like globules of resin left adhere in one row on the support sheet are staggered in relation to the bead-like globules of resin adhering to the sheet in the next row.

3. Apparatus for forming sheet material having bead-like globules of thermoplastic resin adhering to and outstanding from one surface thereof in spaced apart relationship in a controlled pattern comprising a bar carrying a row of needles projecting therefrom, a paste applying roller facing said bar, means for supplying resin composition to said roller to provide a coating thereon, means for supporting said sheet on that second surface thereof opposite said one surface and feeding said sheet material between said bar and said roller with said bar and said roller facing, respectively, said second surface and said one surface of the sheet, means for reciprocating the needle-carrying bar to cause the needles to move in a compound path of movement first to penetrate through and then withdraw from the sheet passing between the bar and the resin applicator roll while the needles move longitudinally with said sheet in the direction of travel of the latter depositing bead-like globules of paste on said one surface, and means for drying the sheet after application of the resin.

4. Apparatus in accordance with claim 3 and comprising in addition means for oscillating the needle-carrying bar in a direction transverse to the path of travel of the sheet material so that the needles are displaced in relation to the width of the sheet at each alternate penetration and withdrawal movement.

References Cited

UNITED STATES PATENTS

| 1,978,620 | 10/1934 | Brewster | 156—252 |
| 2,289,151 | 7/1942 | Teague et al. | 156—252 |
| 3,257,262 | 6/1966 | Epstein | 156—291 |
| 3,313,668 | 5/1967 | Roullard | 156—291 |
| 3,242,024 | 3/1966 | Bova et al. | 156—252 |
| 3,320,109 | 5/1967 | Braner | 156—324 |

LELAND A. SEBASTIAN, Primary Examiner

F. M. GITTES, Assistant Examiner

U.S. Cl. X.R.

156—252, 270, 291, 324, 313